US012663788B2

(12) United States Patent
Paul et al.

(10) Patent No.: US 12,663,788 B2
(45) Date of Patent: Jun. 23, 2026

(54) INFORMATION PROCESSING APPARATUS, INFORMATION PROCESSING METHOD, AND RECORDING MEDIUM FOR PREDICTING ABNORMALITY OF WIND TURBINE

(71) Applicant: KABUSHIKI KAISHA TOSHIBA, Tokyo (JP)

(72) Inventors: Topon Paul, Kawasaki (JP); Reddy Vidhisha, Bangalore (IN); Ayyagari Sai Prem Kumar, Bangalore (IN); Kaneharu Nishino, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 358 days.

(21) Appl. No.: 18/466,123

(22) Filed: Sep. 13, 2023

(65) Prior Publication Data

US 2024/0152132 A1     May 9, 2024

(30) Foreign Application Priority Data

Nov. 4, 2022    (JP) ................................. 2022-177053

(51) Int. Cl.
G05B 23/02          (2006.01)
(52) U.S. Cl.
CPC ................................ G05B 23/0221 (2013.01)
(58) Field of Classification Search
CPC .................................................. G05B 23/0221
See application file for complete search history.

(56) References Cited

U.S. PATENT DOCUMENTS 10,379,001 B2    8/2019  Takahashi
11,336,729 B2    5/2022  Takao et al.
(Continued)

FOREIGN PATENT DOCUMENTS

CN        107409075 A  * 11/2017  ......... H04L 41/0823
JP        2013-25367 A    2/2013
(Continued)

OTHER PUBLICATIONS

Sampaio et al. "Prediction of Motor Failure Time Using An Artificial Neural Network" (2019) (https://pmc.ncbi.nlm.nih.gov/articles/PMC6806350/) (Year: 2019).*
(Continued)

*Primary Examiner* — Sujay Koneru
(74) *Attorney, Agent, or Firm* — Finnegan, Henderson, Farabow, Garrett & Dunner, LLP

(57)          ABSTRACT
An information processing apparatus comprising processing circuitry, the processing circuitry constructs a prediction model for predicting time-series data related to a state of a device/equipment, calculates a prediction error that is a difference between a predicted value of the time-series data predicted by the prediction model and an actual value of the time-series data, divides the prediction error into a plurality of first sections in a time axis direction, calculates a state change amount of the actual value based on the prediction error divided into the plurality of first sections; and constructs a state determination model for determining the state of the device/equipment based on the state change amount.

10 Claims, 13 Drawing Sheets

(56) References Cited

U.S. PATENT DOCUMENTS

| | | | | |
|---|---|---|---|---|
| 2009/0110540 A1* | 4/2009 | Bywaters | ............... | F03D 13/22 |
| | | | | 415/1 |
| 2011/0125419 A1* | 5/2011 | Bechhoefer | ............ | F03D 17/00 |
| | | | | 702/34 |
| 2012/0173172 A1* | 7/2012 | Laurberg | .............. | G01H 1/006 |
| | | | | 702/56 |
| 2013/0101221 A1* | 4/2013 | Fujiki | .................. | B61L 23/047 |
| | | | | 382/225 |
| 2015/0160098 A1* | 6/2015 | Noda | .................... | G01M 99/00 |
| | | | | 702/35 |
| 2016/0033580 A1* | 2/2016 | Qiao | .................... | G01R 31/343 |
| | | | | 324/765.01 |
| 2017/0139400 A1* | 5/2017 | Imamura | ............ | G05B 23/0221 |
| 2019/0362070 A1* | 11/2019 | Abbaszadeh | .......... | F03D 17/00 |
| 2020/0067969 A1* | 2/2020 | Abbaszadeh | ........ | G06N 3/0499 |
| 2020/0251184 A1* | 8/2020 | Washio | .................... | C12M 1/34 |
| 2021/0097438 A1 | 4/2021 | Matsumoto et al. | | |
| 2021/0109687 A1* | 4/2021 | Harai | .................... | G06F 3/1287 |
| 2021/0174229 A1* | 6/2021 | Lim | ......................... | G06N 3/09 |
| 2022/0156529 A1* | 5/2022 | Kimura | .................... | G06T 7/00 |
| 2024/0272976 A1* | 8/2024 | Nakahara | .............. | G06N 20/00 |

FOREIGN PATENT DOCUMENTS

| | | | |
|---|---|---|---|
| JP | 5530019 | B1 | 6/2014 |
| JP | 2016-62258 | A | 4/2016 |
| JP | 2016-157206 | A | 9/2016 |
| JP | 2020-80014 | A | 5/2020 |
| JP | 2021-56927 | A | 4/2021 |
| JP | 6896432 | B2 | 6/2021 |

OTHER PUBLICATIONS

Nihon Keizai Shimbun, "Prediction detection Solution Market Reality and Future Prospects 2021 Edition," 2 pages, and translation, 2 pages (2021).
Japan Patent Office, Office Action in JP Patent App. No. 2022-177053 (Jan. 6, 2026).

* cited by examiner

| EXTERNAL FACTOR | ACTUAL VALUE OF TARGET VARIABLE | PREDICTED VALUE OF TARGET VARIABLE | |
|---|---|---|---|
| | | LINEAR REGRESSION | LSTM |
| X1 | 0.69 | 0.15 | 0.05 |
| X2 | 0.85 | 0.40 | 0.24 |
| X3 | 0.34 | 0.01 | 0.02 |

FIG.13

INFORMATION PROCESSING APPARATUS, INFORMATION PROCESSING METHOD, AND RECORDING MEDIUM FOR PREDICTING ABNORMALITY OF WIND TURBINE

CROSS REFERENCE TO RELATED APPLICATIONS

This application is based upon and claims the benefit of priority from the prior Japanese Patent Application No. 2022-177053, filed on Nov. 4, 2022, the entire contents of which are incorporated herein by reference.

FIELD

An embodiment described herein relates to an information processing apparatus, an information processing method, and a recording medium.

BACKGROUND

In various mechanical equipment such as factories/plants, thermal/wind/solar power generation equipment, elevators, and train cars, it is necessary to prevent a decrease in operating efficiency due to a failure of the mechanical equipment and to minimize downtime. For this reason, for example, predictive maintenance is often performed in which various sensors are attached to these mechanical equipment to continuously measure and monitor a state of the mechanical equipment, a failure or deterioration is detected before a failure occurs, and faulty parts are replaced and repaired. In this type of predictive maintenance, it is important to detect an abnormality sign based on time-series data of the sensor attached to the mechanical equipment. In the existing abnormality sign detection technology, abnormality detection is performed by visualizing the time-series data of the sensor or issuing an alarm based on a statistical value. In addition, in recent years, there has been a high interest in failure prediction based on prediction error calculated by constructing a model for predicting a mechanical equipment state by applying machine learning techniques and using the prediction model. In a case where the prediction error greatly varies due to an external factor or the like, there is a possibility that the abnormality detection is overlooked in the existing abnormality sign detection technology, and there may be many false alarms.

Although it is desirable to perform failure prediction before a failure actually occurs, in a case where a detection value of a target sensor complicatedly varies due to the external factor, it is difficult to perform the failure prediction in the conventional technology, as it may overlook abnormality detection, or there may be many false alarms of the failure prediction.

BRIEF DESCRIPTION OF THE DRAWINGS

FIG. 13 is a diagram illustrating an example of a correlation coefficient of two prediction methods.

DETAILED DESCRIPTION

According to one embodiment, an information processing apparatus comprising processing circuitry, the processing circuitry constructs a prediction model for predicting time-series data related to a state of a device/equipment, calculates a prediction error that is a difference between a predicted value of the time-series data predicted by the prediction model and an actual value of the time-series data, divides the prediction error into a plurality of first sections in a time axis direction, calculates a state change amount of the actual value based on the prediction error divided into the plurality of first sections; and constructs a state determination model for determining the state of the device/equipment based on the state change amount.

Hereinafter, an embodiment of an information processing apparatus, an information processing method, and a program will be described with reference to the drawings. Although main components of the information processing apparatus will be mainly described below, the information processing apparatus may have components and functions that are not illustrated or described. The following description does not exclude components and functions that are not illustrated or described.

Figure 1:
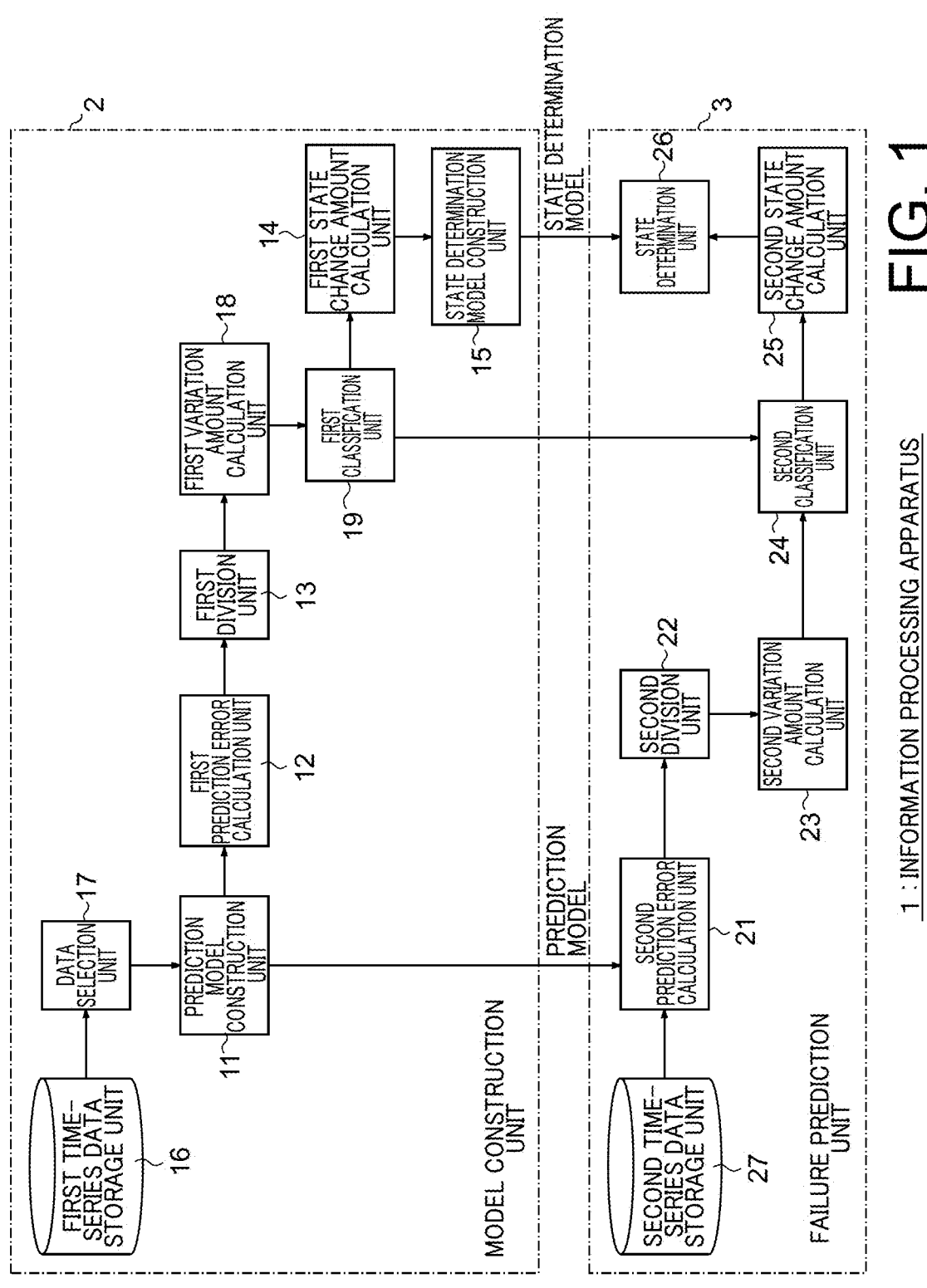
FIG. 1 is a block diagram illustrating a schematic configuration of an information processing apparatus according to the present embodiment.

FIG. 1 is a block diagram illustrating a schematic configuration of an information processing apparatus 1 according to the present embodiment. The information processing apparatus 1 in FIG. 1 includes a function of a state prediction apparatus. The state prediction apparatus is an apparatus that predicts a state of at least one of a device or equipment. In the present specification, at least one of the device or the equipment is referred to as "device/equipment". The "state" is an operation state of the device/equipment, and is a concept including, for example, a state such as normal, abnormal, failure, or deterioration. The "prediction" refers to predicting a future state. An example of the state prediction apparatus is a failure prediction apparatus. The failure prediction apparatus is an apparatus that predicts a failure before the failure occurs. In the present specification, the information processing apparatus 1 according to the present embodiment may be referred to as a failure prediction apparatus.

The information processing apparatus 1 in FIG. 1 roughly includes a model construction unit 2 and a failure prediction unit 3. The information processing apparatus 1 according to the present embodiment may include, for example, processing circuitry. The processing circuitry executes, for example, at least one processing operation of the model construction unit 2 or the failure prediction unit 3 of FIG. 1.

The model construction unit 2 constructs a prediction model and an abnormality determination model used in the failure prediction unit 3. The model construction unit 2 includes a prediction model construction unit 11, a first prediction error calculation unit 12, a first division unit 13, a first state change amount calculation unit 14, and a state determination model construction unit 15. In addition, the model construction unit 2 may include a first time-series data storage unit 16 and a data selection unit 17.

The first time-series data storage unit 16 stores time-series data used by the prediction model construction unit 11 to construct a prediction model. In the present specification, the time-series data used by the prediction model construction unit 11 to construct the prediction model may be referred to as learning time-series data. The first time-series data storage unit 16 is not an essential configuration, and for example, time-series data input from an outside of the information processing apparatus 1 may be supplied to the prediction model construction unit 11 without being stored in the time-series data storage unit.

The data selection unit 17 selects some time-series data from time-series data of a plurality of sensors stored in the first time-series data storage unit 16 or input from the outside of the information processing apparatus 1, and supplies the selected time-series data to the prediction model construction unit 11. The data selection unit 17 may select the time-series data according to knowledge, experience, or the like of an expert or the like, or may select time-series data having a high or low correlation coefficient with time-series data of a sensor of interest. In addition, time-series data without missing values may be selected.

The prediction model construction unit 11 constructs a prediction model for predicting time-series data related to a state of a device/equipment. Examples of the device/equipment for which the prediction model can be constructed by the prediction model construction unit 11 include wind turbines, factories/plants, elevators, and train cars. Various sensors are attached to the device/equipment, and the prediction model construction unit 11 constructs a prediction model based on a predetermined prediction method. The prediction method is, for example, a prediction method based on a regression model, and more specifically, is a method based on linear regression, ridge regression, a neural network, a regression tree, and deep learning. The prediction model construction unit 11 may use prediction methods such as a long short-term memory (LSTM), graph neural network (GNN), or the like. The prediction model is a number of relationships between time-series data of a target sensor and time-series data of other sensors that affect the data of a target sensor.

A predicted value of the target sensor is calculated by the following Formula (1) when a prediction model of a predetermined prediction method is f.

$$\text{Predicted value}=f \text{ (data of first sensor, data of second sensor, . . . , data of } m\text{-th sensor)} \qquad (1)$$

The prediction model constructed by the prediction model construction unit 11 holds a predicted value calculated based on Formula (1).

The first prediction error calculation unit 12 calculates a prediction error that is a difference between a predicted value of time-series data predicted by the prediction model and an actual value of the time-series data. The actual value is the time-series data actually measured by the sensor. The prediction error is represented by the following Formula (2).

$$\text{Prediction error}=\text{actual value}-\text{predicted value} \qquad (2)$$

In Formula (2), the difference between the actual value and the predicted value is used as the prediction error, but a value obtained by converting the difference by multiplying the difference by a predetermined coefficient or performing logarithmic conversion may be used as the prediction error.

The first division unit 13 divides the prediction error calculated by the first prediction error calculation unit 12 into a plurality of first sections in a time axis direction. A time length of the first section is arbitrary, and has an arbitrary time length such as a month, a day, an hour, a minute, or a second. As will be described later, time widths of the plurality of first sections may be the same or different. More specifically, the first division unit 13 may divide the prediction error into a plurality of sections each having a time width corresponding to kernel density estimation.

A first state change amount calculation unit 14 calculates a state change amount of the actual value based on the prediction error divided into the plurality of first sections. The state change amount indicates a magnitude of a state change. The state change amount is an anomaly score in one example. The anomaly score is calculated by a relationship between the prediction errors divided into the plurality of first sections. The anomaly score can be calculated by grouping variation amounts calculated by converting a time axis into a frequency axis. Alternatively, the anomaly score can also be calculated by an average of distances from the target first section to other first sections. A specific method of calculating the anomaly score will be described later. Hereinafter, an example in which the state change amount is the anomaly score will be mainly described, and the first state change amount calculation unit 14 is referred to as a first anomaly score calculation unit 14.

The state determination model construction unit 15 constructs a state determination model for determining a state of a device/equipment based on an anomaly score calculated by the first anomaly score calculation unit 14. For example, the state determination model is an abnormality determination model that determines a failure of the device/equipment.

As the abnormality determination model, upper and lower limit values of the anomaly score can be used as thresholds for abnormality determination. In this case, when an anomaly score of failure prediction data exceeds the threshold, it is determined as abnormal. As the abnormality determination model, a control chart used for quality control of the manufacturing industry can be used. Furthermore, cluster analysis, principal component analysis, vector quantization, self-organization map, and the like, which are unsupervised learning, can be used as the abnormality determination model. A method based on deep learning, for example, an auto encoder (self-encoder) can also be used as the abnormality determination model.

The model construction unit 2 in FIG. 1 may include a first variation amount calculation unit 18 and a first classification unit 19.

The first variation amount calculation unit 18 converts the prediction error divided into the plurality of first sections into variation amounts divided into a plurality of second sections in the frequency axis direction. More specifically, the first variation amount calculation unit 18 may perform fast Fourier transform processing on the prediction error divided into the plurality of first sections to convert the prediction error into the variation amounts divided into the plurality of second sections.

In a case where the first variation amount calculation unit 18 performs the fast Fourier transform processing, a vibration amplitude of a frequency having large amplitudes is selected from the frequency spectrum. For example, 100 vibration amplitudes having a large amplitude are selected. The number of vibration amplitudes to be selected varies depending on the target device/equipment.

The first classification unit 19 groups the variation amounts divided into the plurality of second sections. More specifically, the first classification unit 19 classifies the variation amounts divided into the plurality of second sections into a plurality of groups (also referred to as clusters). The first variation amount calculation unit 18 calculates an anomaly score based on the cluster classified by the first classification unit 19 for each variation amount of each of the plurality of second sections.

The first variation amount calculation unit 18 may calculate a variation amount including a plurality of vibration amplitudes selected in descending order of the vibration amplitudes for each of the plurality of second sections. In this case, the first classification unit 19 classifies the variation amounts divided into the plurality of second sections into a plurality of clusters by comparing the plurality of vibration amplitudes calculated for each of the plurality of second sections.

The first variation amount calculation unit 18 also transforms the number of dimensions of the variation amount in the second section. For example, when the prediction error of the time-series data sampled at ten-minute intervals is divided into units of one day, 144 points are included in one first section. When the fast Fourier transform processing is performed on these pieces of data and 100 vibration amplitudes having larger amplitudes are selected, the number of dimensions of each second section is transformed from 144 to 100.

In addition, the first anomaly score calculation unit 14 may calculate the anomaly score based on a distance between a centroid calculated for each of the plurality of clusters and the variation amounts of each of the plurality of second sections. As a method of calculating the distance, Euclidean distance, a dynamic time warping (DTW), or the like can be used. The first classification unit 19 holds data grouping information and the anomaly score.

Alternatively, the first anomaly score calculation unit 14 may calculate the anomaly score by the k-nearest neighbor algorithm. In this case, the model construction unit 2 in FIG. 1 includes a section identification unit and an average distance calculation unit (not illustrated in FIG. 1).

The section identification unit identifies k (k is an integer of 1 or more) first sections having shortest distances from the first section other than the target first section among the plurality of first sections. The average distance calculation unit calculates, as the anomaly score, an average of distances from the target first section to the k first sections.

The failure prediction unit 3 in FIG. 1 predicts a failure before the device/equipment actually fails. The failure prediction unit 3 includes a second prediction error calculation unit 21, a second division unit 22, a second variation amount calculation unit 23, a second classification unit 24, a second state change amount calculation unit 25, and a state determination unit 26. In addition, the failure prediction unit 3 may include a second time-series data storage unit 27. The second time-series data storage unit 27 stores time-series data used for failure prediction. The time-series data input from the outside of the information processing apparatus 1 may be supplied to the second prediction error calculation unit 21 without being stored in the time-series data storage unit.

The second prediction error calculation unit 21 calculates a prediction error between a predicted value of the time-series data predicted by the prediction model and an actual value of the time-series data, similarly to the first prediction error calculation unit 12.

The second division unit 22 has a function similar to that of the first division unit 13 and divides the prediction error calculated by the second prediction error calculation unit 21 into a plurality of second sections in the time axis direction.

The second variation amount calculation unit 23 has a function similar to that of the first variation amount calculation unit 18, and converts the prediction error calculated by the second prediction error calculation unit 21 into variation amounts divided into a plurality of second sections in the frequency axis direction.

The second classification unit 24 has a function similar to that of the first classification unit 19 and classifies the variation amounts divided into a plurality of sections by the second variation amount calculation unit 23 into a plurality of groups (clusters).

The second state change amount calculation unit 25 has a function similar to that of the first anomaly score calculation unit (first state change amount calculation unit) 14, and calculates a state change amount according to a variation amount belonging to a cluster for each cluster classified by the second classification unit 24. Hereinafter, an example in which the second state change amount calculation unit 25 calculates the anomaly score as the state change amount will be mainly described, and the second state change amount calculation unit 25 is referred to as a second anomaly score calculation unit 25.

The state determination unit 26 determines a state of a device/equipment based on the anomaly score calculated by the second anomaly score calculation unit 25 and the state determination model. The state of the device/equipment includes, for example, a state in which the device/equipment is normal, abnormal, failed, or deteriorated. Thus, the state determination unit 26 can determine whether the device/equipment will fail in the near future.

Figure 2:
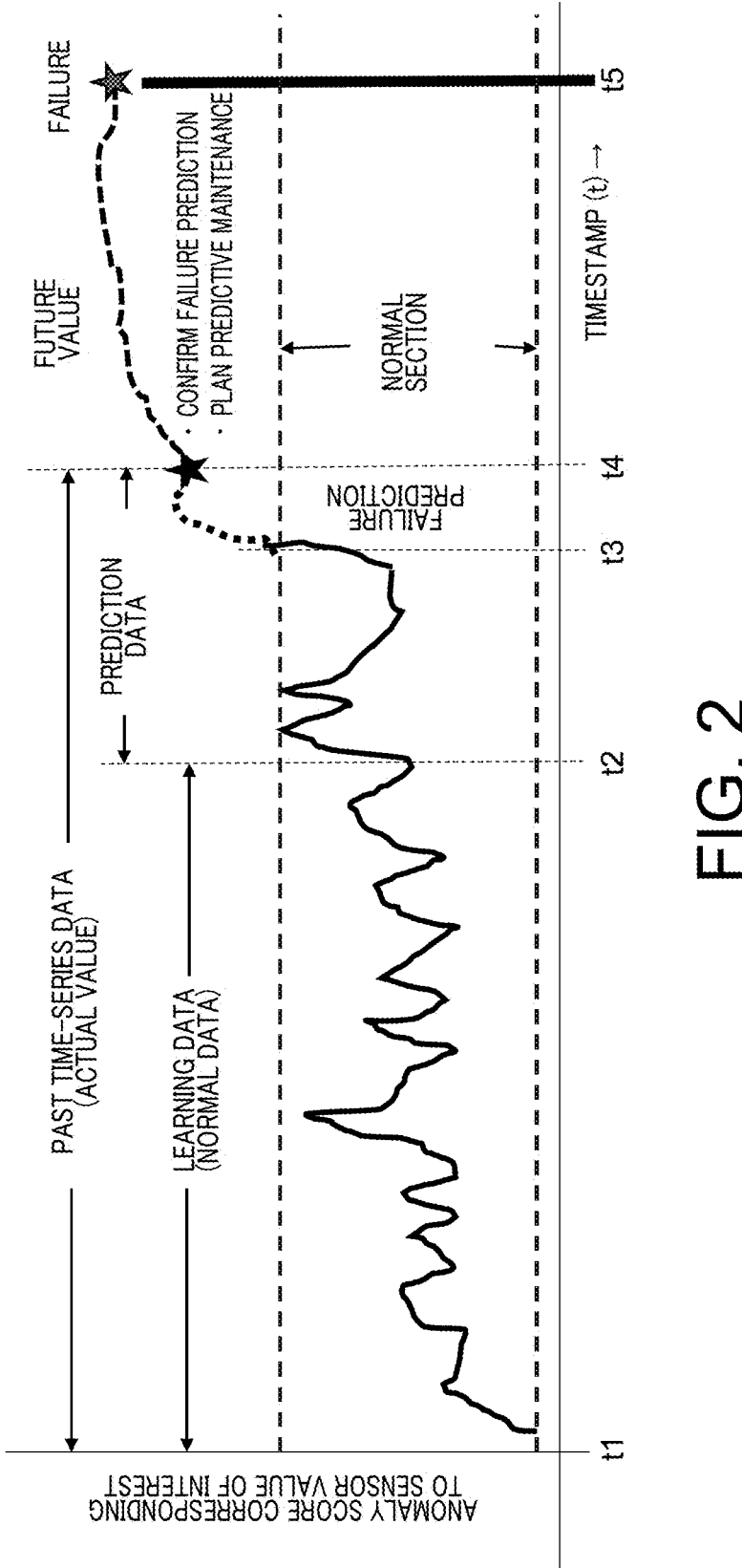
FIG. 2 is a diagram illustrating an example of predicting a failure of a device/equipment based on an anomaly score corresponding to past time-series data measured by a sensor.

FIG. 2 is a diagram illustrating an example of predicting a failure of a device/equipment based on an anomaly score corresponding to past time-series data measured by a sensor. In FIG. 2, a horizontal axis represents a timestamp [time], and a vertical axis represents an anomaly score corresponding to the time-series data of a sensor of interest, and a state in which the anomaly score changes with time is illustrated.

The device/equipment corresponding to the anomaly score in FIG. 2 is, for example, a wind turbine, a factory, a plant, an elevator, or a train car. A prediction model is constructed by using learning data of a sensor of interest (time-series data when no failure occurs). For example, a prediction error that is a difference between a predicted value of time-series data obtained by the prediction model and an actual measurement value of the actual time-series data is calculated, a variation amount is calculated based on the prediction error, and an anomaly score is calculated based on the variation amount.

A period from time t1 to time t2 in FIG. 2 is a learning period of the prediction model and the state determination model, and the time-series data of the sensor is used as learning data. A period from time t2 to time t4 is a period in which the failure prediction unit 3 predicts a failure of the device/equipment, and the time-series data of the sensor is used as prediction data.

In the example in FIG. 2, within the period from time t1 to time t3, the anomaly score corresponding to the time-series data is equal to or less than a predetermined threshold, whereas the anomaly score rapidly increases at time t3. The state determination unit 26 predicts an anomaly score between the times t3 and t4 based on an anomaly score within the period between the times t2 and t3, and predicts a failure at time t4.

Times t4 to t5 indicate a change in the anomaly score in a case where the failure is not predicted. An example in which the device/equipment fails at time t5 is illustrated.

Figure 3:
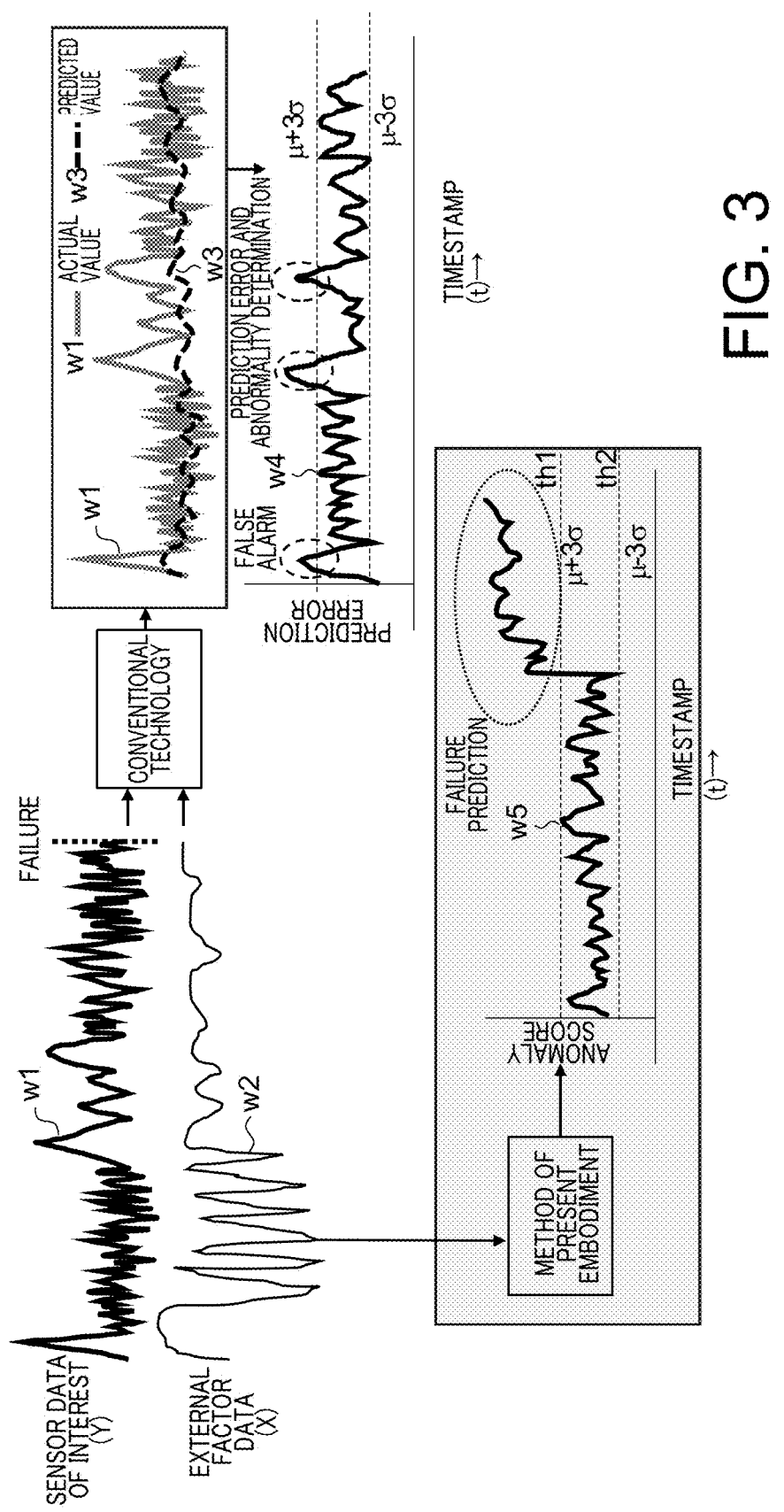
FIG. 3 is a diagram schematically comparing failure prediction according to an existing technology and failure prediction according to the present embodiment.

FIG. 3 is a diagram schematically comparing failure prediction according to an existing technology and failure prediction according to the present embodiment. A signal level of time-series data (hereinafter, may be referred to as sensor data) w1 detected by the sensor frequently changes due to various external factors w2. Therefore, a signal waveform w3 of the predicted value of the sensor data is greatly different from a signal waveform w1 of the actual measurement value of the sensor data.

In a case where the failure is predicted by using the prediction error that is the difference between the actual measurement value and the predicted value, it is conceivable to determine as abnormal when a signal waveform w4 of the prediction error exceeds an upper limit threshold th1 or falls below a lower limit threshold th2. Since the signal level of the prediction error changes frequently, there is a possibility that a large number of false alarms erroneously determining a failure will occur.

On the other hand, in the present embodiment, the anomaly score is calculated from the prediction error, and the failure is detected at a time point when a signal waveform w5 of the anomaly score rapidly changes, so that the possibility of generating a false report is reduced, and the failure can be accurately detected.

Figure 4:
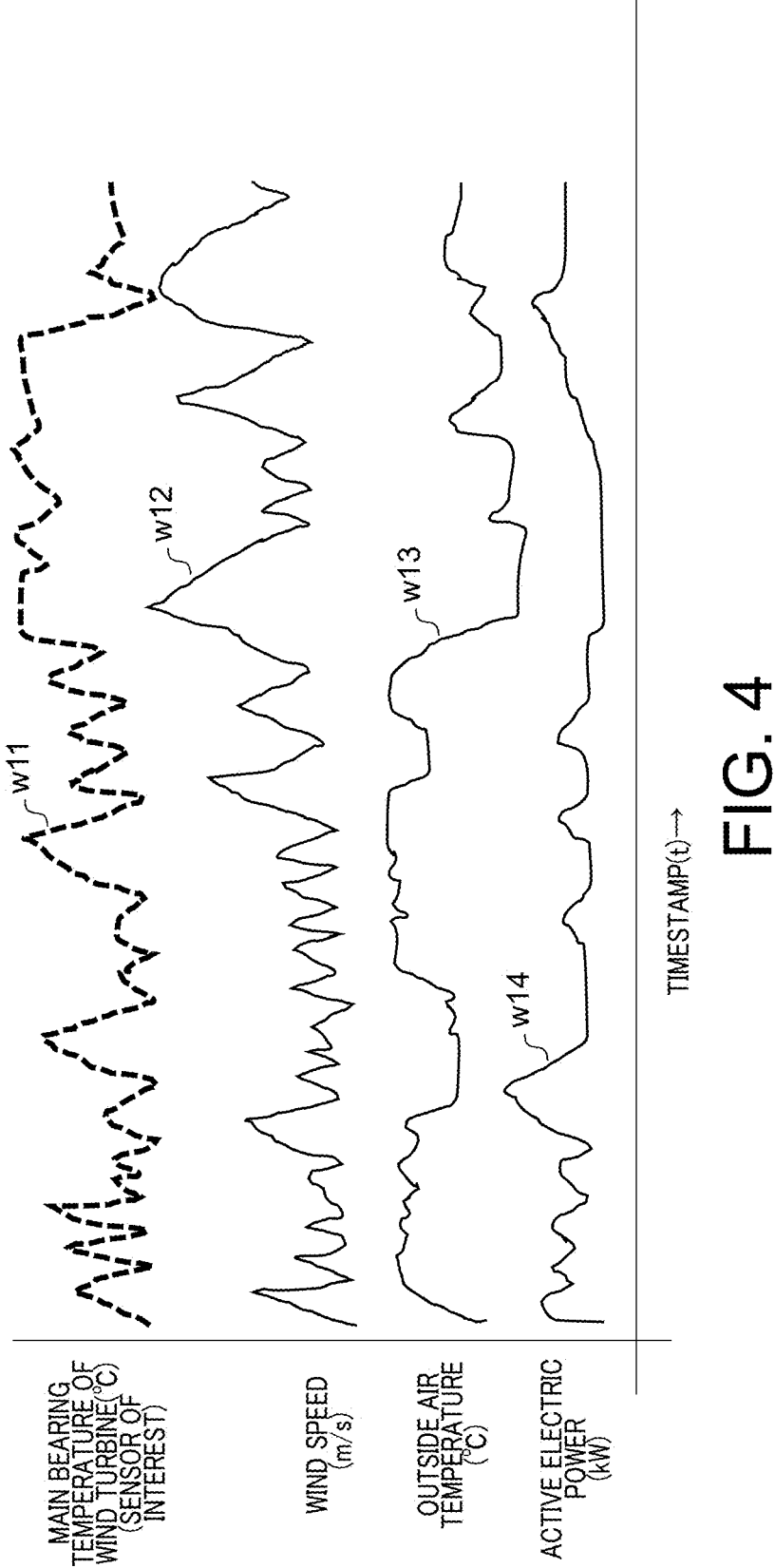
FIG. 4 is a diagram illustrating an example of time-series data measured by a plurality of sensors.

A plurality of sensors are often attached to the mechanical equipment. FIG. 4 is a diagram illustrating an example of time-series data detected by a plurality of sensors. FIG. 4 illustrates time-series data w11 of a main bearing temperature [° C.] of a wind turbine of renewable energy power generation equipment, time-series data w12 of a wind speed [m/s], time-series data w13 of an outside air temperature [° C.], and time-series data w14 of an active electric power [k/W]. Among the time-series data w11 to w14 in FIG. 4, for example, the time-series data w11 is time-series data of a sensor of interest. Part of the time-series data of the sensor of interest is used in the processing of the model construction unit 2, and at least remaining part is used in the processing of the failure prediction unit 3. Therefore, a flag for model construction or a flag for failure prediction may be added to the time-series data of the sensor of interest.

Figure 5:
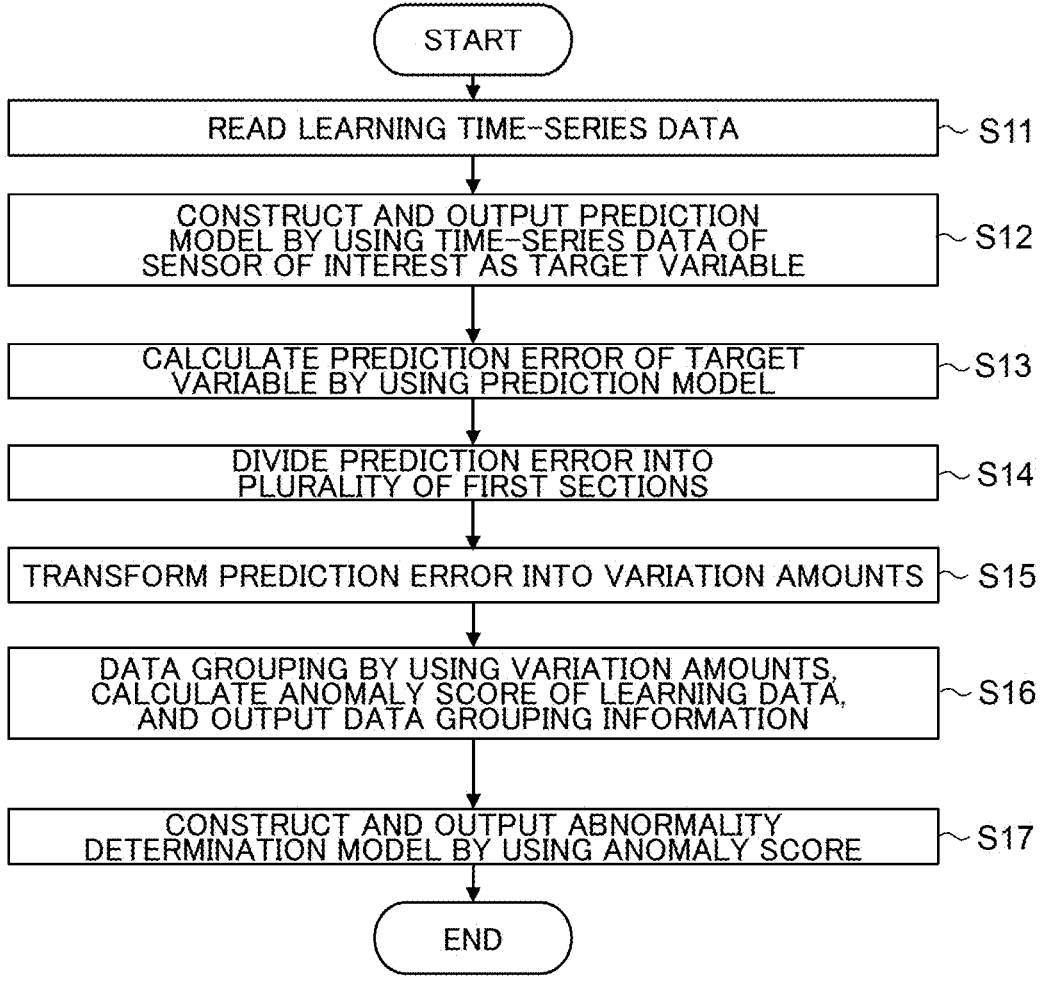
FIG. 5 is a flowchart illustrating an example of a processing steps of a model construction unit.

FIG. 5 is a flowchart illustrating an example of a processing operation of the model construction unit 2. First, the prediction model construction unit 11 acquires learning time-series data (step S11). Here, the prediction model construction unit 11 may read the learning time-series data from the first time-series data storage unit 16 in FIG. 1, or may directly acquire the learning time-series data input from the outside of the information processing apparatus 1.

Next, the prediction model construction unit 11 constructs a prediction model by using time-series data of a sensor of interest as a target variable and time-series data related to the sensor of interest as an explanatory variable (step S12). Next, the first prediction error calculation unit 12 predicts a value of the target variable by using the prediction model and calculates a prediction error that is a difference between a predicted value and an actual value (step S13).

Next, the first division unit 13 divides the prediction error calculated by the first prediction error calculation unit 12 into a plurality of first sections in a time axis direction (step S14).

Next, the first variation amount calculation unit 18 transforms the prediction error divided into the plurality of first sections into variation amounts divided into a plurality of second sections in a frequency axis direction (step S15).

Next, the first classification unit 19 classifies the variation amounts divided into the plurality of second sections into a plurality of groups (clusters). In addition, the first anomaly score calculation unit 14 calculates an anomaly score according to the variation amount belonging to the cluster for each cluster classified by the first classification unit 19 (step S16).

Next, the state determination model construction unit 15 constructs a state determination model for determining a state of the device/equipment based on the anomaly score calculated by the first anomaly score calculation unit 14 (step S17).

Figure 6:
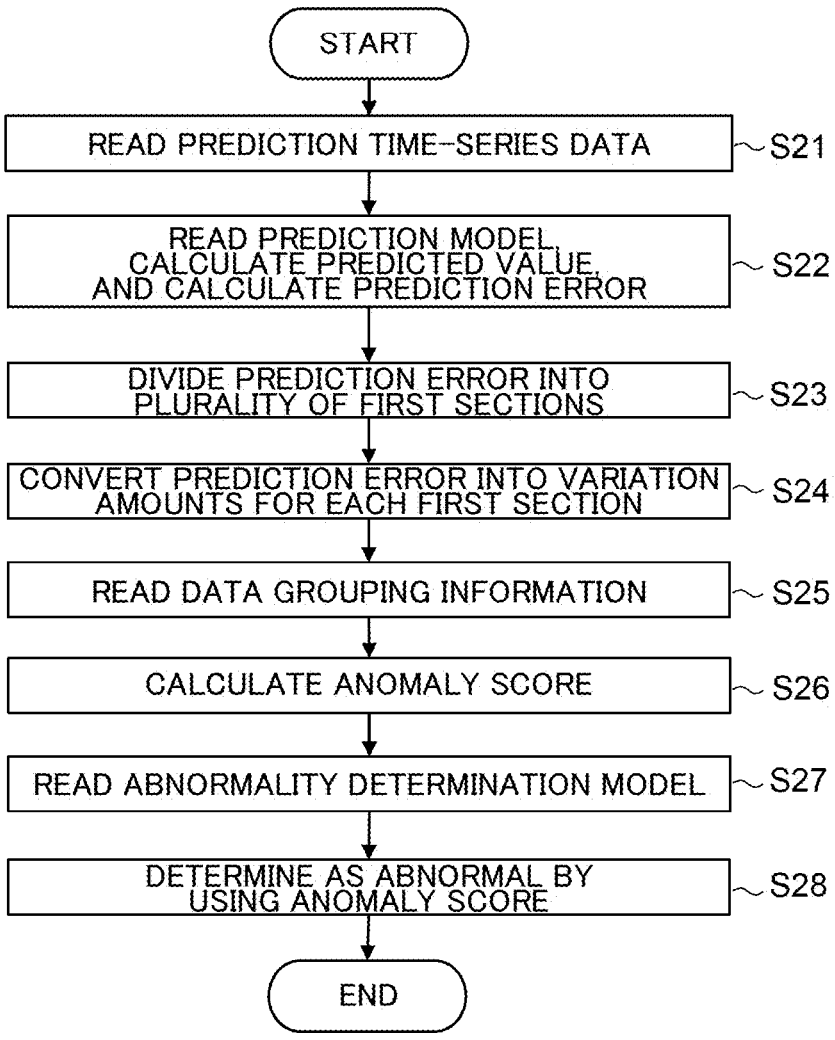
FIG. 6 is a flowchart illustrating an example of a processing steps of a failure prediction unit.

FIG. 6 is a flowchart illustrating an example of a processing operation of the failure prediction unit 3. First, the second prediction error calculation unit 21 acquires failure prediction time-series data (step S21). The failure prediction time-series data may be acquired from the second time-series data storage unit 27 or may be directly acquired from the outside of the information processing apparatus 1. The acquired time-series data is an actual measurement value.

Next, the second prediction error calculation unit 21 calculates a predicted value of the time-series data of the sensor of interest by using the prediction model constructed by the prediction model construction unit 11, and calculates a prediction error which is a difference between the predicted value and the actual value (step S22).

Next, the second division unit 22 divides the prediction error calculated by the second prediction error calculation unit 21 into a plurality of first sections in the time axis direction (step S23).

Next, the second variation amount calculation unit 23 converts the prediction error calculated by the second prediction error calculation unit 21 into variation amounts divided into a plurality of second sections in the frequency axis direction (step S24).

Next, the second division unit 22 groups the variation amounts divided into the plurality of second sections and classifies the variation amounts into a plurality of clusters (step S25).

Next, the second anomaly score calculation unit 25 obtains a centroid of the cluster classified by the second classification unit 24, and calculates a distance between the variation amounts of each of the plurality of second sections and the centroid of the corresponding cluster as an anomaly score (step S26).

Next, the state determination unit 26 acquires the state determination model constructed in step S17 of FIG. 5 (step S27).

Next, the state determination unit 26 determines a state of the device/equipment based on the anomaly score calculated by the second anomaly score calculation unit 25 and the state determination model (step S28).

Figure 7:
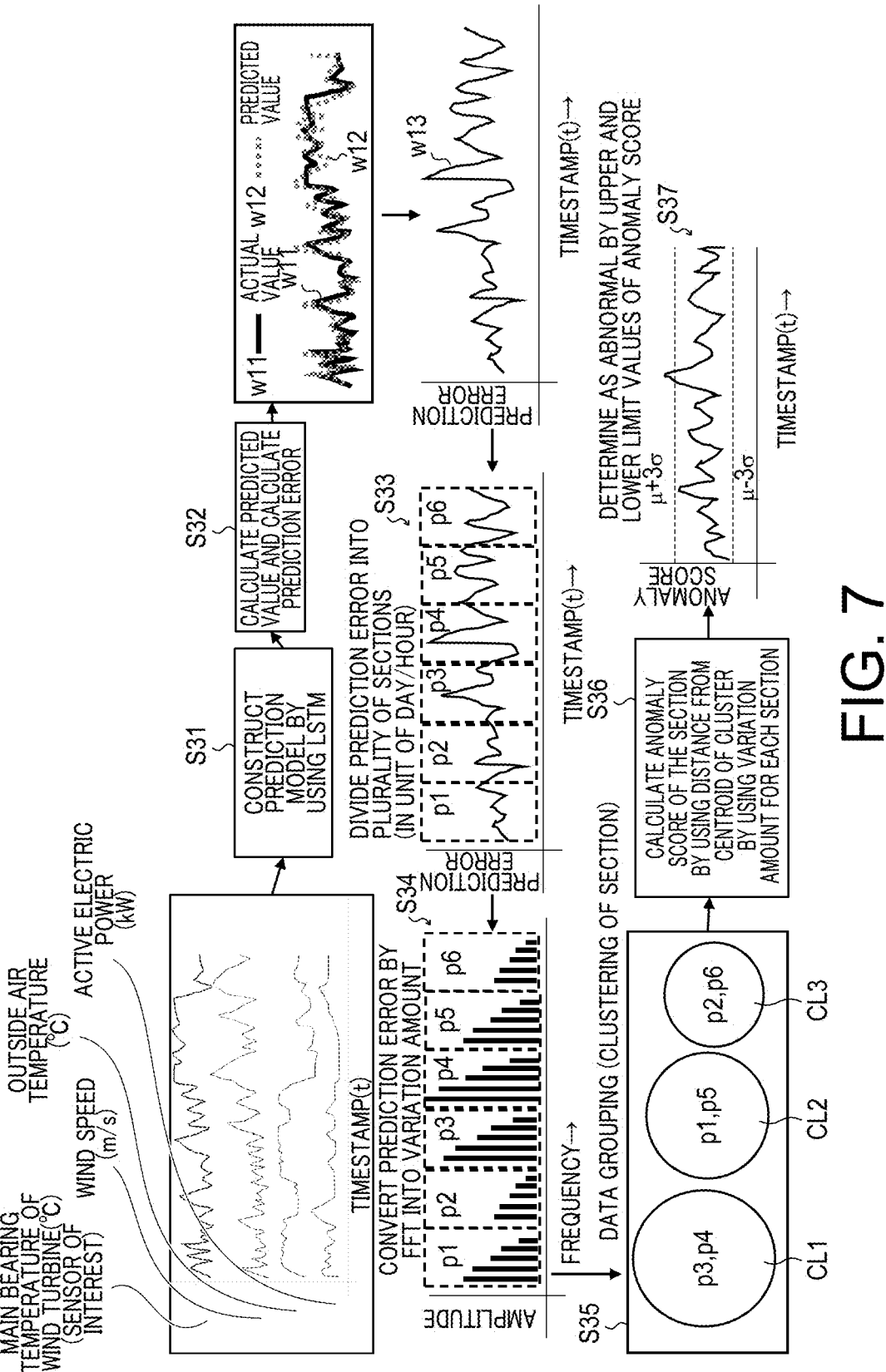
FIG. 7 is a diagram illustrating an example of constructing a prediction model and a state determination model based on time-series data of a number of sensors attached to a wind turbine.

FIG. 7 is a diagram illustrating an example of constructing a prediction model and a state determination model based on time-series data of a sensor attached to a wind turbine. The time-series data of a main bearing temperature of the wind turbine is input to the information processing apparatus 1 as a target variable. This time-series data is the sensor data of interest. In addition, time-series data of a wind speed, an outside air temperature, and an active electric power that affect the main bearing temperature of the wind turbine are input to the information processing apparatus 1 as explanatory variables.

The prediction model construction unit 11 constructs a prediction model for predicting the main bearing temperature of the wind turbine by using the LSTM or another prediction method (step S31). The prediction model for predicting the main bearing temperature is represented by, for example, the following Formula (3).

$$\text{Main bearing temperature} = f \text{ (wind speed, outside air} \atop \text{temperature, active electric power)} \qquad (3)$$

The function f in Formula (3) is, for example, an LSTM, a linear regression, an autoencoder (self-encoder), or a neural network.

The first prediction error calculation unit 12 calculates a predicted value of the main bearing temperature of the wind turbine by using the prediction model represented by Formula (3), and calculates a prediction error w13 which is a difference between an actual value w11 and a predicted value w12 (step S32).

Next, the first division unit 13 divides the prediction error w13 into a plurality of first sections p1 to p6 in the time axis direction (step S33).

Next, the first variation amount calculation unit 18 performs fast Fourier transform processing on the plurality of prediction errors divided into the plurality of first sections p1 to p6 to calculate variation amounts (step S34). The variation amounts are divided into a plurality of second sections p1 to p6 in the frequency axis direction. Step S34 indicates an example in which top five vibration amplitudes are selected as the variation amounts for each of the second sections p1 to p6.

Next, the first classification unit 19 classifies the plurality of variation amounts divided into the plurality of second sections p1 to p6 into, for example, three clusters CL1 to CL3 (step S35). In the example of FIG. 7, the first classification unit 19 performs, for example, k-means clustering to classify into a cluster CL1 including second sections p3 and p4, a cluster CL2 including second sections p1 and p5, and a cluster CL3 including second sections p2 and p6.

Next, the first anomaly score calculation unit 14 calculates an anomaly score of the second sections p1 to p6 based on the variation amounts of the second sections p1 to p6 and the distance from the centroid of each cluster of the second sections p1 to p6 (step S36). For example, since the second section p1 belongs to the cluster CL2, the distance of the second section p1 from the centroid of the cluster CL2 is calculated.

Next, the state determination model construction unit 15 constructs a state determination model in which the anomaly scores of the second sections p1 to p6 are arranged in order of timestamps and an upper limit threshold and a lower limit threshold are set (step S37).

Figure 8:
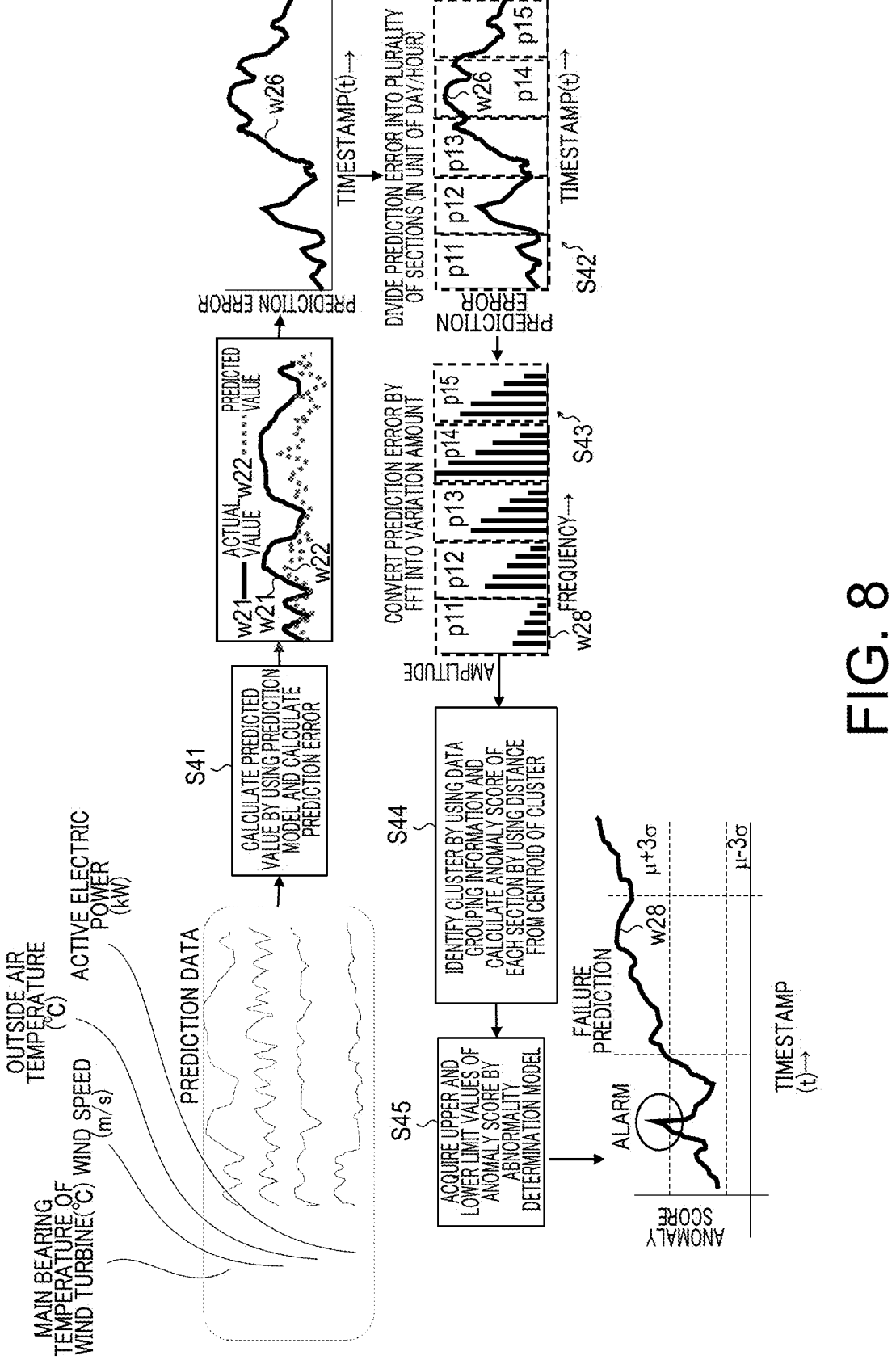
FIG. 8 is a diagram illustrating an example of making failure prediction of the wind turbine by using a constructed (learned) state determination model.
Figure 9:
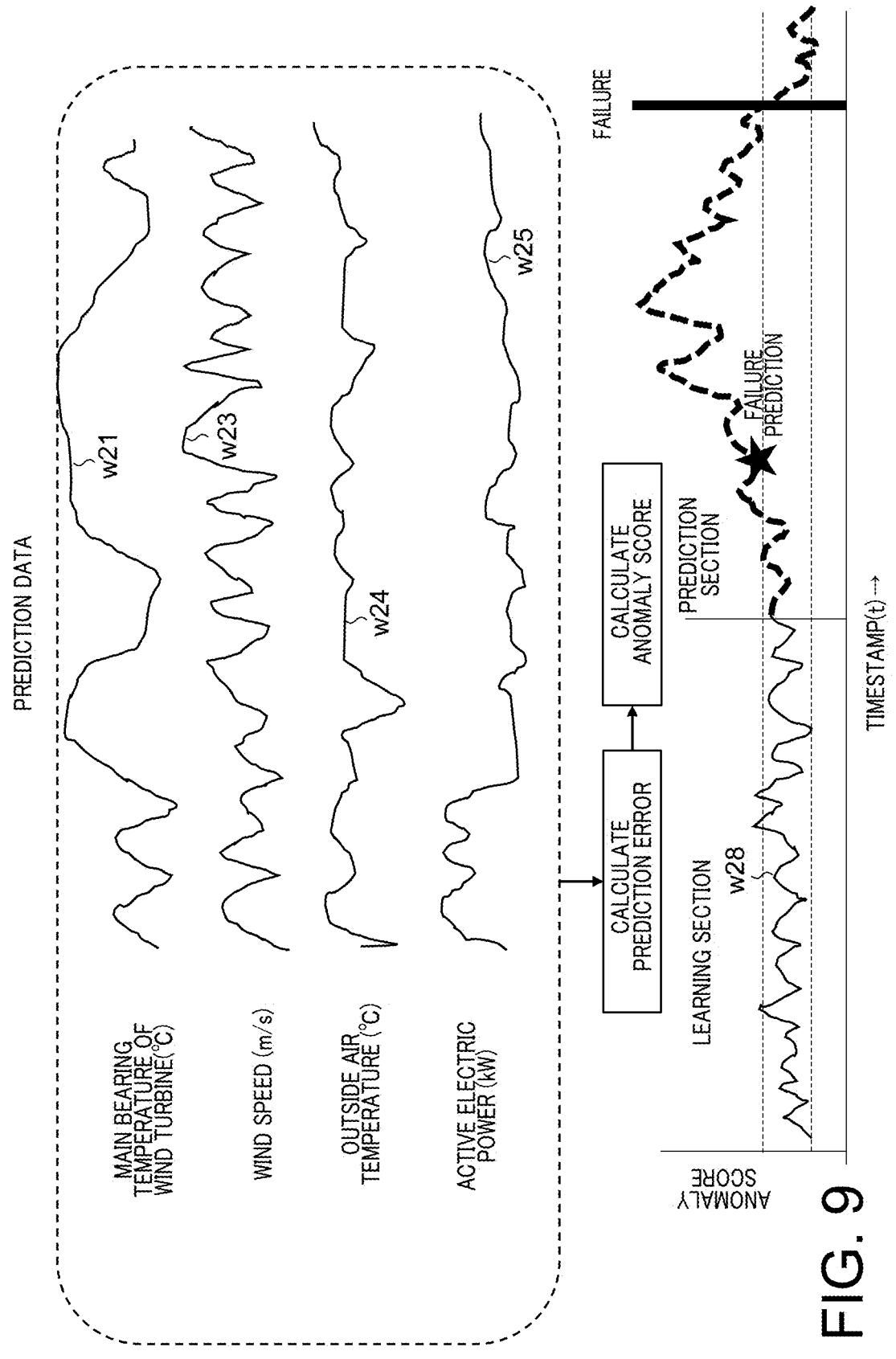
FIG. 9 is a waveform diagram of the time-series data of the sensors and failure prediction based on an anomaly score.

FIGS. 8 and 9 are diagrams illustrating an example in which the failure prediction of the wind turbine is performed by using the constructed (learned) state determination model. The second prediction error calculation unit 21 acquires prediction time-series data, and calculates a predicted value of the time-series data by using the prediction model constructed by the prediction model construction unit

11. As illustrated in detail in FIG. 9, the prediction time-series data includes, for example, a main bearing temperature w21, a wind speed w23, an outside air temperature w24, and an active electric power w25 of the wind turbine.

The second prediction error calculation unit 21 calculates a prediction error w26 which is a difference between an actual value w21 and a predicted value w22 of the prediction time-series data (step S41).

Next, the second division unit 22 divides the prediction error w26 into a plurality of first sections p11 to p15 (step S42). Each of the first sections p11 to p15 has a time length of, for example, a day, an hour, a minute, or a second.

Next, the second variation amount calculation unit 23 performs fast Fourier transform processing on the divided prediction error w26 to convert into a variation amount (step S43). The second variation amount calculation unit 23 selects top five vibration amplitudes w27 for each of the plurality of second sections p11 to p15.

Next, the second classification unit 24 classifies the variation amounts of each second section into three clusters, and the second anomaly score calculation unit 25 calculates a distance of each second section from the centroid of each cluster as an anomaly score w28 (step S44).

Next, when the anomaly score calculated in step S44 exceeds an upper limit value or falls below a lower limit value of the state determination model constructed in step S37 in FIG. 7, the state determination unit 26 determines as abnormal and predicts a failure (step S45).

Figure 10:
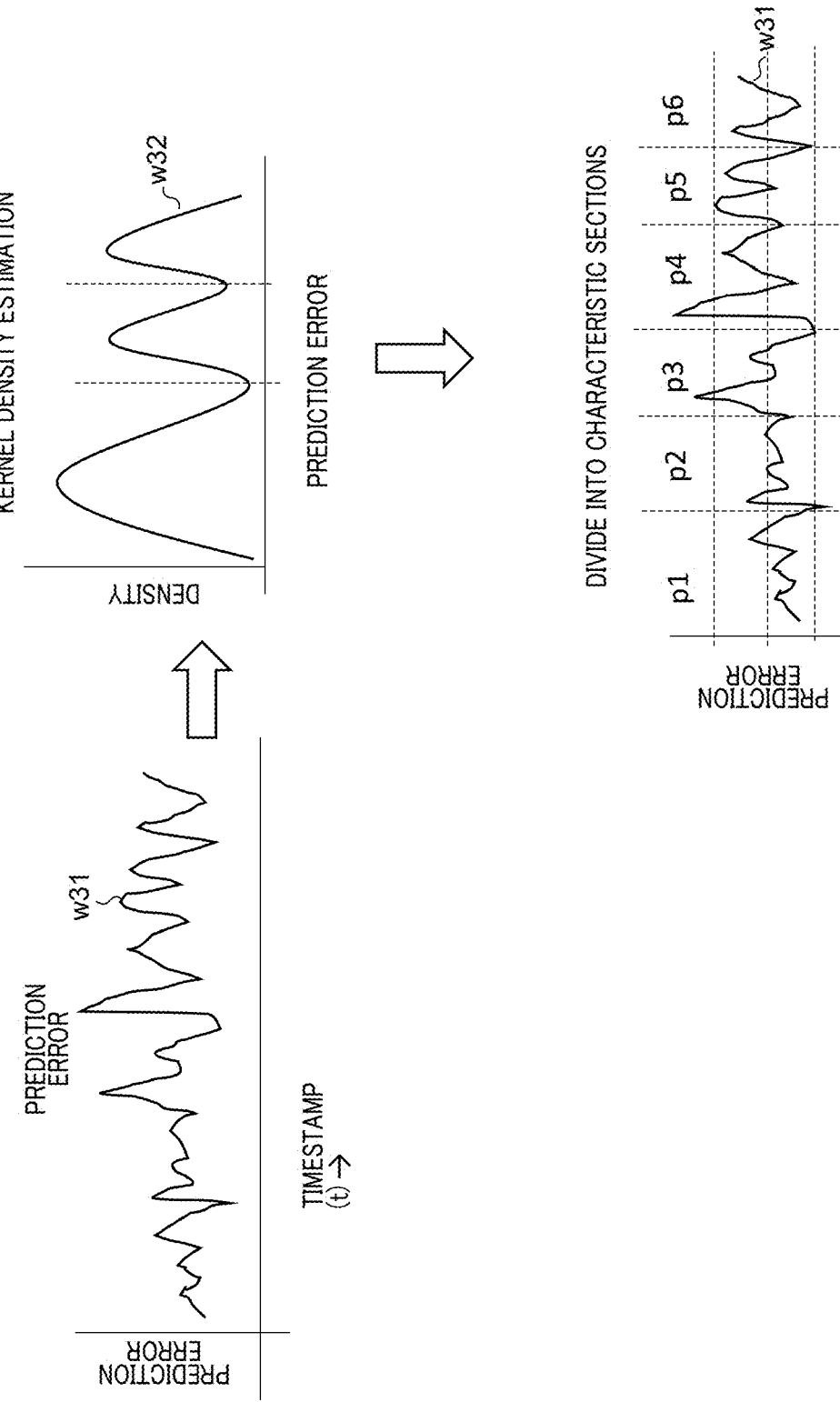
FIG. 10 is a diagram illustrating an example in which a prediction error is divided into a plurality of first sections by kernel density estimation.

The first division unit 13 in the model construction unit 2 and the second division unit 22 in the failure prediction unit 3 divide the prediction error into a plurality of first sections, but the time widths of the plurality of first sections are not necessarily the same. For example, FIG. 10 illustrates an example in which the prediction error is divided into a plurality of first sections by kernel density estimation. In the kernel density estimation, a kernel density estimation amount w32 is calculated from a prediction error w31, a mountain (peak value) and a valley (bottom value) of the kernel density estimation amount w32 are identified, and clusters are divided at the time of the valley to generate a plurality of clusters. A representative value of each cluster is calculated. The representative value is, for example, an average value or a median value of the prediction errors of each cluster. The prediction error of each cluster is set as the representative value. The representative value of each cluster is set as one state level, and a plurality of second sections are generated by being divided by time (change point) at which the state level changes.

When the prediction error is divided into the plurality of first sections by the kernel density estimation illustrated in FIG. 10, the time widths of each of the first sections are not necessarily the same.

In the above-described embodiment, an example has been described in which the anomaly score is calculated by performing clustering after performing the fast Fourier transform processing on the prediction error divided into the plurality of first sections, but the anomaly score may be calculated by another method.

Figure 11:
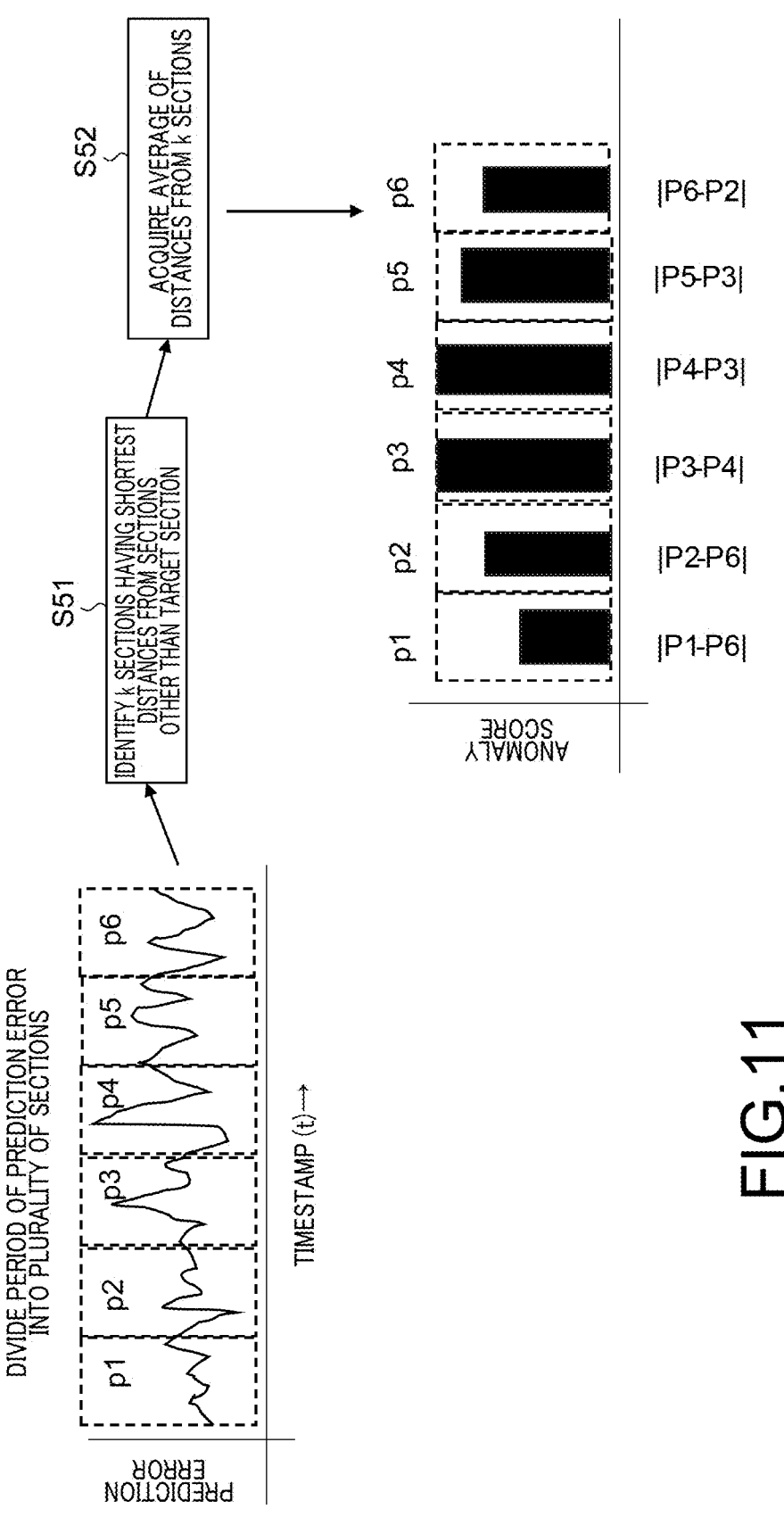
FIG. 11 is a diagram for explaining an example of calculating an anomaly score by a k-nearest neighbor algorithm.

FIG. 11 is a diagram for explaining an example of calculating an anomaly score by a k-nearest neighbor algorithm. First, k first sections having shortest distances from first sections other than a target first section are identified (step S51). Next, an average of distances from the identified k first sections is obtained, and the obtained value is taken as the anomaly score (step S52). In the example in FIG. 11, k=1, the first section having the shortest distance of the first section p1 is p6, the first section having the shortest distance of the first section p2 is p6, the first section having the shortest distance of the first section p3 is p4, the first section having the shortest distance of the first section p4 is p3, the first section having the shortest distance of the first section p5 is p3, and the first section having the shortest distance of the first section p6 is p2.

By calculating the anomaly score by the k-nearest neighbor algorithm, the anomaly score can be calculated by simpler processing than that of calculating the anomaly score by using both the fast Fourier transform processing and clustering.

The prediction model construction unit 11 can construct a prediction model by selecting any of a plurality of prediction methods. Examples of the plurality of selectable prediction methods include a linear regression equation, an LSTM network, and a neural network.

Figure 12:
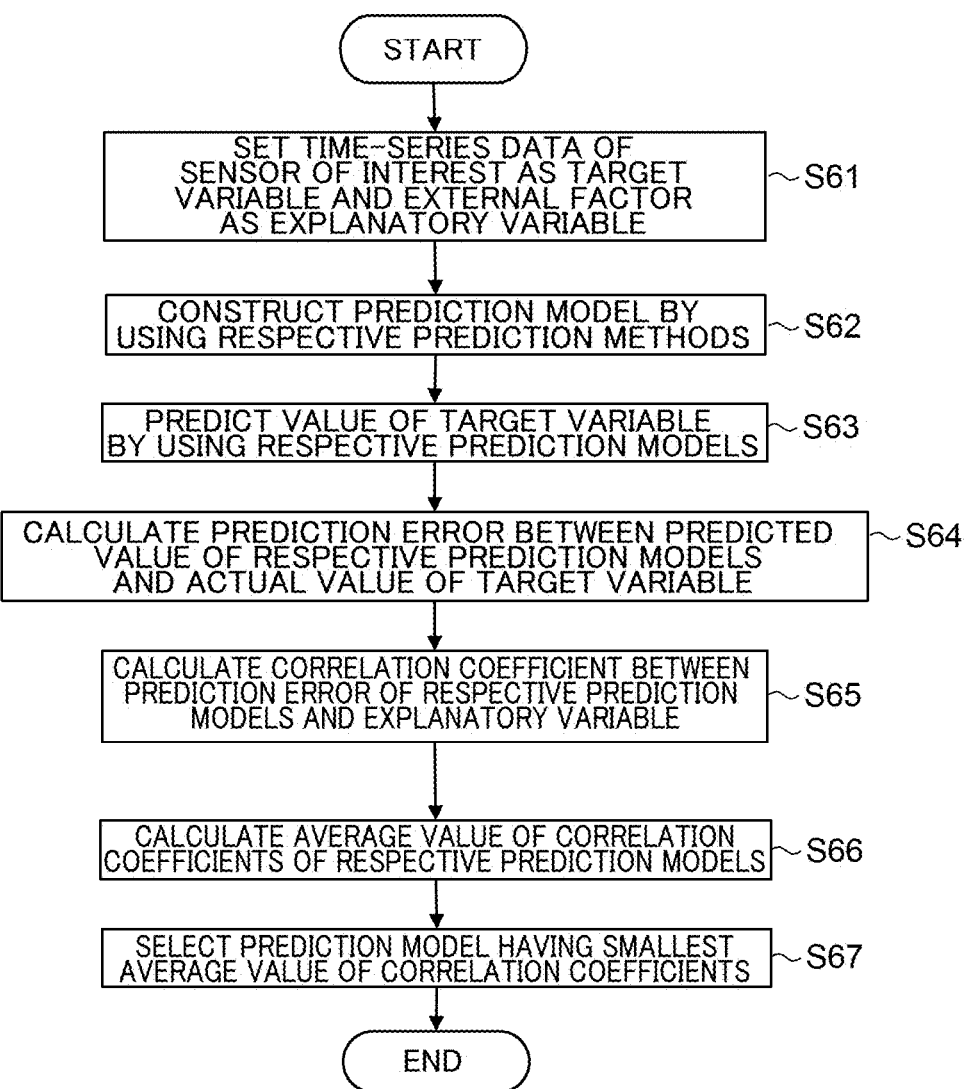
FIG. 12 is a flowchart illustrating an example of processing steps for selecting any of a plurality of prediction methods.

FIG. 12 is a flowchart illustrating an example of a processing operation for selecting any of a plurality of prediction methods. The processing of this flowchart is performed by the prediction model construction unit 11, for example.

First, time-series data of a sensor of interest is set as a target variable, and time-series data of an external factor is set as an explanatory variable (step S61). Next, a plurality of prediction models are constructed by using a plurality of respective prediction methods (step S62).

Next, the value of the target variable is predicted by using each prediction model (step S63). Next, a prediction error that is a difference between the predicted value of each prediction model obtained in step S63 and an actual value of the target variable is calculated (step S64).

A correlation coefficient between the prediction error of each prediction model and the explanatory variable is calculated (step S65). An average value of the correlation coefficients of the respective prediction models is calculated (step S65).

Next, the average value of the correlation coefficients of the respective prediction models is calculated (step S66). Finally, a prediction model having a smallest average value of the correlation coefficients of the respective prediction models is selected (step S67).

FIG. 13 is a diagram illustrating an example of a correlation coefficient of two prediction methods. FIG. 13 illustrates a correlation coefficient between external factors X1, X2, and X3 and an actual measurement value of the target variable, a correlation coefficient between the external factors X1, X2, and X3 and a prediction error in a case where the target variable is predicted by using the linear regression equation, and a correlation coefficient between the external factors X1, X2, and X3 and a prediction error in a case where the target variable is predicted by using the LSTM network.

In the case of FIG. 13, since the correlation coefficient of the LSTM network is smaller than that of the linear regression equation, the LSTM network is selected.

As described above, in the present embodiment, the prediction error that is the difference between the predicted value and the actual value is divided into the plurality of first sections, the anomaly score is calculated for each of the plurality of first sections, and the abnormality is determined based on the anomaly score. As a result, it is possible to accurately predict the failure by reducing false alarms erroneously predicting the failure.

At least a part of the information processing apparatus 1 described in the above-described embodiment may be configured by hardware or software. In a case where the information processing apparatus 1 is configured by software, a program for implementing at least some functions of the information processing apparatus 1 may be stored in a recording medium such as a flexible disk or a CD-ROM, and may be read and executed by a computer. The recording medium is not limited to a removable recording medium such as a magnetic disk or an optical disk, and may be a fixed recording medium such as a hard disk apparatus or a memory.

In addition, a program for implementing at least some functions of the information processing apparatus 1 may be distributed via a communication line (including wireless communication) such as the Internet. Further, the program may be distributed via a wired line or a wireless line such as the Internet or stored in a recording medium in an encrypted, modulated, or compressed state.

(1) An information processing apparatus comprising processing circuitry, the processing circuitry configured to:
    construct a prediction model for predicting time-series data related to a state of a device/equipment;
    calculate a prediction error that is a difference between a predicted value of the time-series data predicted by the prediction model and an actual value of the time-series data;
    divide the prediction error into a plurality of first sections in a time axis direction;
    calculate a state change amount of the actual value based on the prediction error divided into the plurality of first sections; and
    construct a state determination model for determining the state of the device/equipment based on the state change amount.

(2) The information processing apparatus according to (1), wherein
    an anomaly score of the actual value is calculated based on the prediction error, and
    the state determination model for determining the state of the device/equipment is constructed based on the anomaly score.

(3) The information processing apparatus according to (2), wherein
    the processing circuitry is further configured to convert the prediction error divided into the plurality of first sections into variation amounts divided into a plurality of second sections in a frequency axis direction, wherein
    the anomaly score is calculated by grouping the variation amounts divided into the plurality of second sections.

(4) The information processing apparatus according to (3), wherein
    fast Fourier transform processing on the prediction error divided into the plurality of first sections is performed to convert the prediction error into the variation amounts divided into the plurality of second sections.

(5) The information processing apparatus according to (3) or (4), wherein
    the processing circuitry is further configured to classify the variation amounts divided into the plurality of second sections into a plurality of clusters, wherein
    the anomaly score is calculated based on the classified cluster for each of the variation amounts of the plurality of second sections.

(6) The information processing apparatus according to (5), wherein
    the variation amount including a plurality of vibration amplitudes selected in descending order of the vibration amplitudes is calculated for each of the plurality of second sections, and the variation amounts divided into the plurality of second sections is classified into the plurality of clusters by comparing the plurality of vibration amplitudes calculated for each of the plurality of second sections.

(7) The information processing apparatus according to (5) or (6), wherein the anomaly score is calculated based on a distance between a centroid calculated for each of the plurality of clusters and the variation amount of each of the plurality of second sections.

(8) The information processing apparatus according to (2), wherein the processing circuitry is further configured to:

identify k (k is an integer of 1 or more) first sections having shortest distances from first sections other than a target first section among the plurality of first sections; and calculate an average of distances from the target first section to the k first sections as the anomaly score.

(9) The information processing apparatus according to any one of (1) to (8), wherein the time-series data related to the state of the device/equipment is output data of a sensor that detects the state of the device/equipment.

(10) The information processing apparatus according to any one of (1) to (9), wherein the constructed state determination model is an abnormality determination model that determines a failure of the device/equipment.

(11) The information processing apparatus according to any one of (1) to (10), wherein time widths of the divided plurality of first sections are the same.

(12) The information processing apparatus according to any one of (1) to (10), wherein the prediction error is divided into the plurality of first sections each having a time width corresponding to kernel density estimation.

(13) The information processing apparatus according to any one of (1) to (12), wherein the processing circuitry is further configured to predict the state of the device/equipment by using the prediction model and the state determination model.

(14) The information processing apparatus according to (13), wherein the processing circuitry is further configured to:

calculate a prediction error that is a difference between the predicted value of the time-series data predicted by the prediction model and the actual value of the time-series data;

divide the calculated prediction error into the plurality of first sections in a frequency axis direction;

calculate an anomaly score of the actual value based on the prediction error divided into the plurality of first sections; and determine the state based on the calculated anomaly score and the state determination model.

(15) The information processing apparatus according to (14), wherein when the calculated anomaly score exceeds an upper limit value or falls below a lower limit value of the state determination model, it is determined to be abnormal.

(16) The information processing apparatus according to (14) or (15), wherein the divided plurality of first sections are converted into variation amounts divided into a plurality of second sections in the frequency axis direction and the variation amounts are grouped to calculate the anomaly score, or an average of distances from a target first section to k (k is an integer of 1 or more) first sections having shortest distances from first sections other than the target first section is calculated as the anomaly score.

(17) The information processing apparatus according to any one of (1) to (16), the processing circuitry is further configured to:

calculate a correlation coefficient between each of the calculated plurality of prediction error and an explanatory variable based on a plurality of the constructed prediction model candidates based on a plurality of prediction methods; and select the prediction model to be used to construct the prediction model based on an average value of a plurality of the correlation coefficients corresponding to each of the plurality of prediction model candidates.

(18) An information processing method comprising:

constructing a prediction model for predicting time-series data related to a state of a device/equipment;

calculating a prediction error that is a difference between a predicted value of the time-series data predicted by the prediction model and an actual value of the time-series data;

dividing the prediction error into a plurality of first sections in a time axis direction;

calculating a state change amount of the actual value based on the prediction error divided into the plurality of first sections; and constructing a state determination model that determines the state of the device/equipment based on the state change amount.

(19) The information processing method according to (18), wherein an anomaly score of the actual value is calculated based on the prediction error, and the state determination model for determining the state of the device/equipment is constructed based on the anomaly score.

(20) A non-transitory computer readable recording medium storing a program for causing a computer to execute:

constructing a prediction model for predicting time-series data related to a state of a device/equipment;

calculating a prediction error that is a difference between a predicted value of the time-series data predicted by the prediction model and an actual value of the time-series data;

dividing the prediction error into a plurality of first sections in a time axis direction;

calculating a state change amount of the actual value based on the prediction error divided into the plurality of first sections; and constructing a state determination model for determining the state of the device/equipment based on the state change amount.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

15

16

The invention claimed is:

1. An information processing apparatus comprising processing circuitry, the processing circuitry configured to:

receive learning time-series data from at least one sensor attached to a wind turbine, the at least one sensor sensing at least one of: a main bearing temperature, wind speed, outside air temperature, and active electric power;

construct, using the learning time-series data and at least one of long short-term memory (LSTM), a linear regression, an autoencoder, or graph neural network (GNN), a prediction model for predicting time-series data related to an abnormality of the wind turbine;

calculate a prediction error that is a difference between a predicted value of the time-series data predicted by the prediction model and an actual value of the time-series data;

divide the prediction error into a plurality of first sections in a time axis direction;

perform fast Fourier transform (FFT) processing on the prediction error divided into the plurality of first sections, and calculate a variation amount including a plurality of vibration amplitudes selected in descending order of magnitude for each of a plurality of second sections divided in a frequency axis direction;

classify the variation amounts divided into the plurality of second sections into a plurality of clusters by comparing the plurality of vibration amplitudes calculated for each of the plurality of second sections;

calculate an anomaly score of the actual value based on a distance between a centroid calculated for each of the plurality of clusters and the variation amount of each of the plurality of second sections;

construct a state determination model for determining the abnormality of the wind turbine based on the anomaly score;

predict a state of the wind turbine by using the prediction model and the state determination model; and output at least an alarm indicating a predicted failure to prompt performance of predictive maintenance based on the predicted failure.

2. The information processing apparatus according to claim 1, wherein the processing circuitry is further configured to:

identify k (k is an integer of 1 or more) first sections having shortest distances from first sections other than a target first section among the plurality of first sections; and calculate an average of distances from the target first section to the k first sections as the anomaly score.

3. The information processing apparatus according to claim 1, wherein time widths of the divided plurality of first sections are the same.

4. The information processing apparatus according to claim 1, wherein the prediction error is divided into the plurality of first sections each having a time width corresponding to kernel density estimation.

5. The information processing apparatus according to claim 1, wherein the processing circuitry is further configured to:

calculate a prediction error that is a difference between the predicted value of the time-series data predicted by the prediction model and the actual value of the time-series data;

divide the calculated prediction error into the plurality of first sections in a frequency axis direction;

calculate an anomaly score of the actual value based on the prediction error divided into the plurality of first sections; and determine the state based on the calculated anomaly score and the state determination model.

6. The information processing apparatus according to claim 5, wherein when the calculated anomaly score exceeds an upper limit value or falls below a lower limit value of the state determination model, it is determined to be abnormal.

7. The information processing apparatus according to claim 5, wherein the divided plurality of first sections are converted into variation amounts divided into a plurality of second sections in the frequency axis direction and the variation amounts are grouped to calculate the anomaly score, or an average of distances from a target first section to k (k is an integer of 1 or more) first sections having shortest distances from first sections other than the target first section is calculated as the anomaly score.

8. The information processing apparatus according to claim 1, the processing circuitry is further configured to:

calculate a correlation coefficient between each of the calculated plurality of prediction error and an explanatory variable based on a plurality of the constructed prediction model candidates based on a plurality of prediction methods; and select the prediction model to be used to construct the prediction model based on an average value of a plurality of the correlation coefficients corresponding to each of the plurality of prediction model candidates.

9. An information processing method comprising:

receiving learning time-series data from at least one sensor attached to a wind turbine, the at least one sensor sensing at least one of: a main bearing temperature, wind speed, outside air temperature, and active electric power;

constructing, using the learning time-series data and at least one of long short-term memory (LSTM), a linear regression, an autoencoder, or graph neural network (GNN), a prediction model for predicting time-series data related to an abnormality of the wind turbine;

calculating a prediction error that is a difference between a predicted value of the time-series data predicted by the prediction model and an actual value of the time-series data;

dividing the prediction error into a plurality of first sections in a time axis direction;

performing fast Fourier transform (FFT) processing on the prediction error divided into the plurality of first sections, and calculating a variation amount including a plurality of vibration amplitudes selected in descending order of magnitude for each of a plurality of second sections divided in a frequency axis direction;

classifying the variation amounts divided into the plurality of second sections into a plurality of clusters by comparing the plurality of vibration amplitudes calculated for each of the plurality of second sections;

calculating an anomaly score of the actual value based on a distance between a centroid calculated for each of the plurality of clusters and the variation amount of each of the plurality of second sections;

constructing a state determination model that determines the abnormality of the wind turbine based on the anomaly score;

predicting a state of the wind turbine by using the prediction model and the state determination model; and outputting at least an alarm indicating a predicted failure to prompt performance of predictive maintenance based on the predicted failure.

10. A non-transitory computer readable recording medium storing a program for causing a computer to execute:

receiving learning time-series data from at least one sensor attached to a wind turbine, the at least one sensor sensing at least one of: a main bearing temperature, wind speed, outside air temperature, and active electric power;

constructing, using the learning time-series data and at least one of long short-term memory (LSTM), a linear regression, an autoencoder, or graph neural network (GNN), a prediction model for predicting time-series data related to an abnormality of the wind turbine;

calculating a prediction error that is a difference between a predicted value of the time-series data predicted by the prediction model and an actual value of the time-series data;

dividing the prediction error into a plurality of first sections in a time axis direction;

performing fast Fourier transform (FFT) processing on the prediction error divided into the plurality of first sections, and calculating a variation amount including a plurality of vibration amplitudes selected in descending order of magnitude for each of a plurality of second sections divided in a frequency axis direction;

classifying the variation amounts divided into the plurality of second sections into a plurality of clusters by comparing the plurality of vibration amplitudes calculated for each of the plurality of second sections;

calculating an anomaly score of the actual value based on a distance between a centroid calculated for each of the plurality of clusters and the variation amount of each of the plurality of second sections;

constructing a state determination model for determining the abnormality of the wind turbine based on the anomaly score;

predicting a state of the wind turbine by using the prediction model and the state determination model; and outputting at least an alarm indicating a predicted failure to prompt performance of predictive maintenance based on the predicted failure.

* * * * *